United States Patent
Iino et al.

(10) Patent No.: US 6,877,112 B1
(45) Date of Patent: Apr. 5, 2005

(54) RESET CONTROL SYSTEM AND METHOD

(75) Inventors: Hideyuki Iino, Kawasaki (JP); Hiroyuki Utsumi, Kawasaki (JP); Yoshio Hirose, Kawasaki (JP); Ken Ryu, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 410 days.

(21) Appl. No.: 09/678,733

(22) Filed: Oct. 4, 2000

(30) Foreign Application Priority Data

Nov. 5, 1999 (JP) .......................................... 11-315654

(51) Int. Cl.$^7$ ................................................ G06F 11/00
(52) U.S. Cl. ............................. 714/23; 714/11; 714/12; 703/23
(58) Field of Search ............................. 714/11, 12, 13, 714/28, 3, 23, 34; 703/23

(56) References Cited

U.S. PATENT DOCUMENTS

| | | | |
|---|---|---|---|
| 5,630,102 A | * | 5/1997 | Johnson et al. ............... 703/28 |
| 6,175,914 B1 | * | 1/2001 | Mann ........................ 712/227 |
| 6,226,756 B1 | * | 5/2001 | Mueller ..................... 713/500 |
| 6,367,032 B1 | * | 4/2002 | Kasahara .................... 714/25 |
| 6,415,393 B2 | * | 7/2002 | Satoh ......................... 714/30 |
| 6,564,339 B1 | * | 5/2003 | Swoboda et al. ............ 714/30 |

FOREIGN PATENT DOCUMENTS

JP 64-55652 3/1989

* cited by examiner

*Primary Examiner*—Robert Beausoliel
*Assistant Examiner*—Anne L. Damiano
(74) *Attorney, Agent, or Firm*—Staas & Halsey LLP (57) ABSTRACT

An OR circuit (34, 35) OR-operates an emulator reset signal (106, 107) based on a reset instruction from an emulator (30) and an external reset signal (115, 116) supplied from an external reset generation circuit. The OR operation result is distributed and supplied to a processor (10) and a companion chip (20) as a system reset signal (109, 110), thereby initializing both chips of the processor (10) and the companion chip (20) in accordance with the reset the emulator (30).

15 Claims, 6 Drawing Sheets

PRIOR ART

RESET CONTROL SYSTEM AND METHOD

BACKGROUND OF THE INVENTION

1. Field of the Invention

The present invention relates to reset control systems and methods, particularly to reset control schemes for systems provided with a processor having a debug support function and a companion chip connected to the processor.

2. Description of the Related Art

In a conventional system using a processor, the processor incorporates a DSU (Debug Support Unit) having a debug support function for software debug during program development or hardware debug during system development. An external emulator prepared for debug is connected to the DSU, and a debug command is supplied from the external emulator to the DSU, thereby performing system debug.

Figure 1:
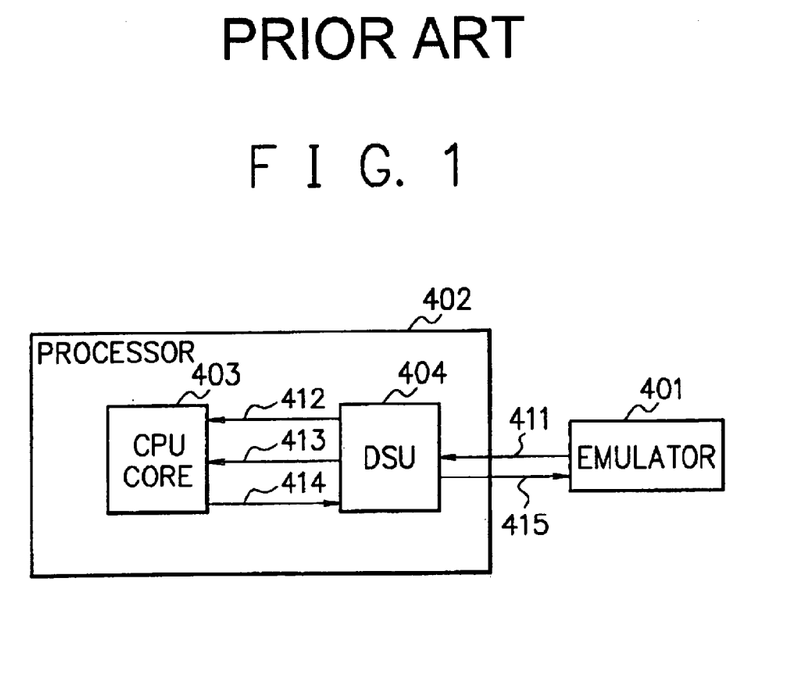
FIG. 1 is a block diagram showing the construction of a conventional system having an emulator and a processor.

FIG. 1 is a block diagram showing a conventional system having a processor and an emulator.

Referring to FIG. 1, reference numeral 401 denotes an emulator for emulating debug processing; and 402 denotes a processor for performing various data processing operations. The processor 402 has a CPU core 403 for executing instructions of a program, and a DSU 404 for supporting debug processing. The DSU 404 has an interface to the emulator 401 and is connected to the emulator 401.

The emulator 401 transmits a debug command 411 to the DSU 404. As the debug command 411 to be transmitted, a break command for generating a break-interrupt for load/store of an arbitrary instruction or arbitrary data, an arbitrary data value, or step execution every instruction, or an execution command for instructing to start execution of an instruction at the start of debug or after a break-interrupt is used. Alternatively, a read/write command for confirming or updating the value of an internal register or a memory at the time of break-interrupt, or a reset command used to initialize the internal state of the processor for debug processing from the start is used.

When receiving the debug command 411 transmitted from the emulator 401, the DSU 404 outputs a debug mode signal 412 so the processor 402 transits from the user mode as the normal operative state to the debug mode as the debug state. The DSU 404 decodes the debug command and supplies a decoding result 413 to the CPU core 403.

The CPU core 403 executes processing in accordance with the received decoding result 413 of the debug command and notifies the DSU 404 of an execution result 414. The DSU 404 supplies the execution result 414 received from the CPU core 403 to the emulator 401 as an execution result 415 of the debug command 411 transmitted from the emulator.

Thus, the processor 402 having the debug support function processes and executes the debug command 411 transmitted from the emulator 401, thereby debugging the system.

As a system such as a PC (Personal Computer) or an LBP (Laser Beam Printer) using a high-performance processor, recently, a system dedicated to a specific application purpose is built in consideration of performance and cost. In such a system, the processor has only the CPU core function, and a bus control section and peripheral resources necessary for the application purpose of the system are provided on a companion chip different from the processor. This allows systems for different application purposes commonly to use identical high-performance processors. Hence, various systems can be built by changing only the companion chip without changing the processor for each system.

Figure 2:
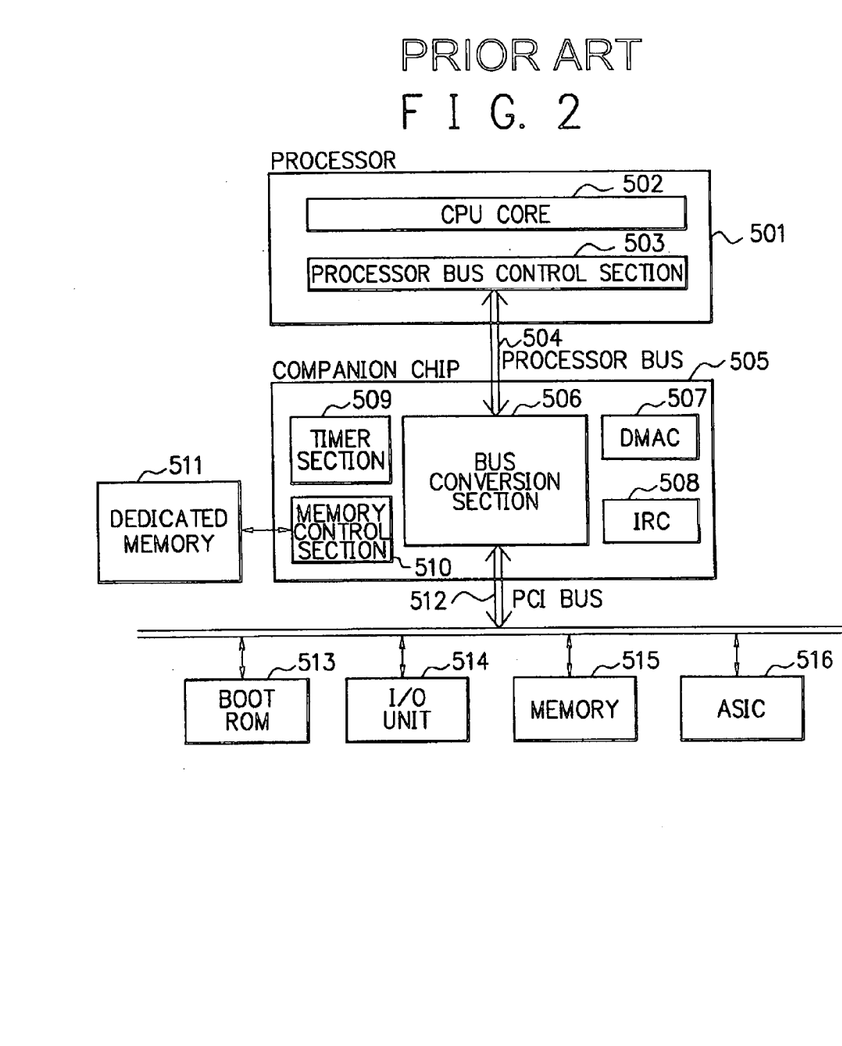
FIG. 2 is a block diagram showing the construction of a conventional system having a processor and a companion chip.

FIG. 2 is a block diagram showing a conventional system having a processor and a companion chip.

Referring to FIG. 2, a processor 501 has a CPU core 502, and a processor bus control section 503 for controlling data communication on a processor bus 504 which connects the processor 501 with a companion chip 505.

The companion chip 505 has a bus control section and peripheral resources. In the example shown in FIG. 2, the companion chip 505 has a bus conversion section 506 which performs bus protocol conversion between the processor bus 504 and a PCI bus 512 as a bus control section. The companion chip 505 also has, as peripheral resources necessary for the system, a DMAC (Direct Memory Access Controller) 507, an IRC (Interrupt Request Controller) 508, a timer section 509, a memory control section 510, and a UART (Universal Asynchronous Receiver Transmitter) (not shown).

The DMAC 507 controls DMA (Direct Memory Access) transfer for performing direct data transmission/reception between a memory 515 and another unit without the intervention of the processor 501. The IRC 508 controls an interrupt request from a unit connected to the system. The timer section 509 measures time for timeout detection. The memory control section 510 controls a dedicated memory 511 externally connected to the companion chip 505. The UART connects a word parallel controller or the like to a bit serial communication network.

A Boot ROM 513, an I/O unit 514, a memory 515, and an ASIC (Application Specific Integrated Circuit) 516 are connected to the PCI bus 512. The operations of these units are controlled by the processor 501 and the companion chip 505.

The processor 501 is connected to the companion chip 505 through the processor bus 504 to control the peripheral resources 507, 508, 509, and 510, such as the DMAC, incorporated in the companion chip 505. When the processor 501 wants to access the resources 513 to 516 connected to the PCI bus 512, bus protocol conversion between the processor bus 504 and the PCI bus 512 is performed by the bus conversion section 506 incorporated in the companion chip 505, and then the processor 501 accesses the resources 513 to 516 connected to the PCI bus 512.

Figure 3:
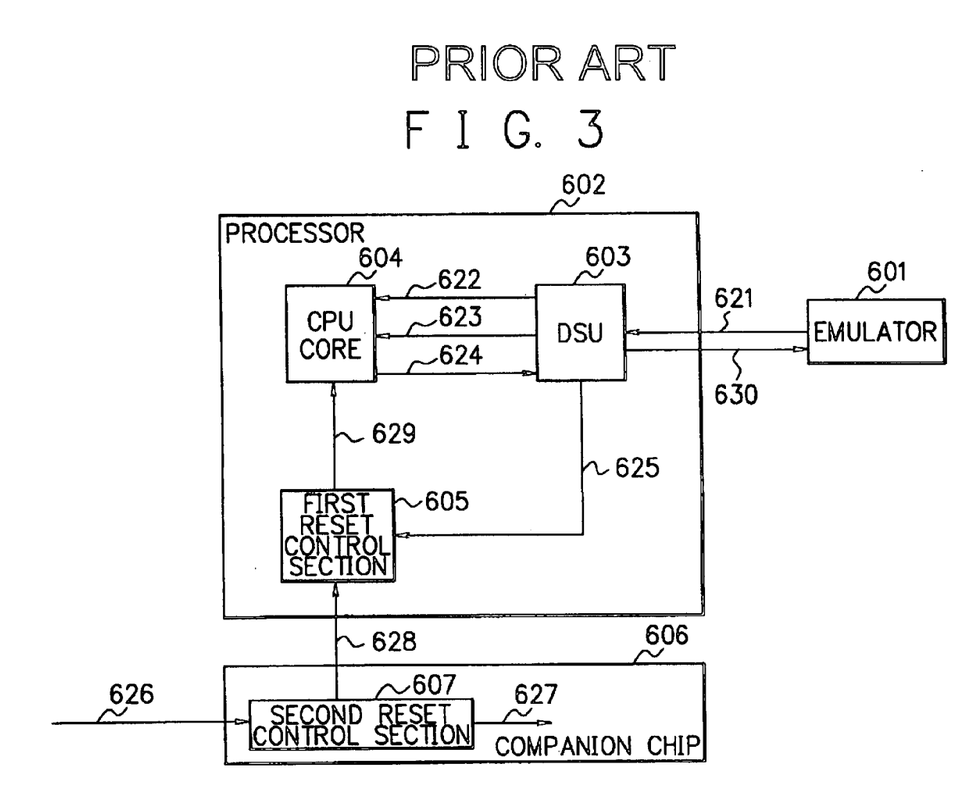
FIG. 3 is a block diagram for explaining a debugging manner for a conventional system having an emulator, a processor, and a companion chip.

FIG. 3 is a block diagram for explaining an example of debugging manner for a system built by a processor incorporating a DSU, a companion chip, and an emulator.

Referring to FIG. 3, reference numeral 601 denotes an emulator 601; and 602 denotes a processor. The processor 602 has a DSU 603, a CPU core 604, and a first reset control section 605. The DSU 603 has an interface to the emulator 601 and is connected to the emulator 601.

The first reset control section 605 OR-operates a first reset signal 625 obtained by decoding a debug reset command 621 output from the emulator 601 by the DSU 603 and a second reset signal 628 generated by a second reset control section 607 in a companion chip 606 from an external reset signal 626 output from an external reset generation circuit (not shown) or the like. The OR operation result is output to the CPU core 604 as a first internal reset signal 629 for initializing the CPU core 604.

The companion chip 606 has a second reset control section 607, and a bus control section and peripheral resources (none are shown). The second reset control section 607 distributes the external reset signal 626 output from the external reset generation circuit (not shown) to a second internal reset signal 627 and the second reset signal 628. The second internal reset signal 627 initializes the internal state of the companion chip 606. The second reset signal 628 is output to the first reset control section 605 in the processor 602.

The companion chip 606 is connected to the processor 602 through a processor bus and individual signal lines (none are shown). The bus control section and peripheral resources (none are shown) in the companion chip 606 are controlled by the processor 602.

The debug operation of the system shown in FIG. 3 will be described next.

The emulator 601 transmits the debug command 621 to the DSU 603. When receiving the debug command 621, the DSU 603 outputs a debug mode signal 622 to make the processor 602 transit from the user mode as the normal operative state to the debug mode as the debug state.

The DSU 603 also decodes the debug command 621 supplied from the emulator 601. If the debug command 621 is a command other than a reset command, the DSU 603 supplies the decoding result to the CPU core 604 as a debug instruction signal 623.

The CPU core 604 executes processing in accordance with the received debug instruction signal 623 and notifies the DSU 603 of an execution result 624. The DSU 603 also notifies the emulator 601 of the execution result 624 received from the CPU core 604 as an execution result 630 of the debug command 621 transmitted from the emulator 601.

On the other hand, when the debug command 621 supplied from the emulator 601 and decoded by the DSU 603 is a reset command, the DSU 603 outputs the first reset signal 625 to the first reset control section 605.

When receiving the first reset signal 625, the first reset control section 605 OR-operates the first reset signal 625 and the second reset signal 628 based on the external reset signal 626. Consequently, the first reset control section 605 outputs the first internal reset signal 629 to the CPU core 604 to initialize the CPU core 604.

The external reset signal 626 output from the external reset generation circuit (not shown) is input to the second reset control section 607. When receiving the external reset signal 626, the second reset control section 607 outputs the second internal reset signal 627 to initialize the internal state of the companion chip 606, and also outputs the second reset signal 628 to the first reset control section 605.

As described above, in the recent high-performance system, the processor and the companion chip are formed as separate chips. However, these chips are not completely separated, and the operation of the entire system must be guaranteed by cooperation of both chips. For this reason, for hardware debug or software debug during system development, debug must be executed for both the processor and the companion chip. No correct debug can be performed unless both chips are initialized.

However, to reset the internal state of the conventional system as shown in FIG. 3, which has the processor 602 and companion chip 606 as separate chips, the processor 602 can be initialized in accordance with the reset instruction from the emulator 601, though the companion chip 606 cannot. Hence, the system cannot be totally reset.

Additionally, in the system shown in FIG. 3, independently of whether or not the processor 602 is in the user mode (normal operative state) or the debug mode (debug state), both the processor 602 and the companion chip 606 are initialized when the external reset signal 626 is output from the external reset generation circuit. If the external reset signal 626 is undesirably input due to some reason such as an error in reset generation circuit while the processor 602 is debugging the system in the debug mode when transiting in response to the debug command 621 transmitted from the emulator 601, the processor 602 and the companion chip 606 are initialized, and the internal state during debug, which is stored in the CPU core 604, is lost.

SUMMARY OF THE INVENTION

It is an object of the present invention to initialize both of a processor and a companion chip in accordance with a reset instruction from an emulator.

It is another object of the present invention to prevent the processor in the debug mode from being initialized even when an external reset signal is input, and maintain the internal state of the processor during debug.

According to the present invention, in a reset control system for a system having a central processing section and a peripheral control section which are formed on separate chips, a system reset signal is generated on the basis of an external reset signal and an emulator reset signal based on a reset instruction from an emulator and supplied to both chips of the central processing section and the peripheral control section.

In another characteristic feature of the reset control system according to the present invention, the system further comprises a mask processing section for masking the external reset signal when the emulator is in operation.

A synchronization processing section for synchronizing activation timings after reset between the central processing section and the peripheral control section may be provided on at least one of the chips of the central processing section and the peripheral control section.

In addition, a system reset output section for generating and outputting a system reset signal on the basis of an external reset signal and an emulator reset signal based on a reset instruction from an emulator may be provided in the chip of the central processing section.

According to the present invention with the above construction, the system reset signal generated on the basis of the emulator reset signal based on the reset instruction from the emulator and the external reset signal from the external reset generation circuit is supplied not only to the central processing section but also to the peripheral control section on a separate chip. For this reason, both chips of the central processing section and the peripheral control section can be initialized not only by initialization based on the external reset signal but also in accordance with the emulator reset signal.

In another characteristic feature of the present invention, when the emulator is in operation, the external reset signal is masked and invalidated. Even when the external reset signal is undesirably input during debug, the external reset signal can be invalidated, and the central processing section or the peripheral control section can hold internal data during debug without being initialized. Hence, undesirable reset by the external reset signal can be avoided.

When the synchronization processing section is provided, any time lag for reset cancel due to a difference in internal circuit between the central processing section and the peripheral control section is adjusted, and the central processing section and the peripheral control section are synchronously activated after reset operation. For this reason, one chip that has been activated earlier can be prevented from accessing the other chip that has not been activated yet.

When the system reset output section is provided in the central processing section, the reset instruction from the emulator to the central processing section can be sent in the form of a command. Even when the types of reset operations are increased in number, the types of reset instructions can be increased in number only by expanding the command without changing the interface to the emulator. In addition, since the external reset signal is directly input to the central processing section, the input path of the external reset signal need not be changed independently of whether or not the emulator is connected, so debug can be performed in the same state as in normal operation.

DETAILED DESCRIPTION OF THE PREFERRED EMBODIMENTS

Hereinafter, embodiments of the present invention will be described with reference to drawings.

Figure 4:
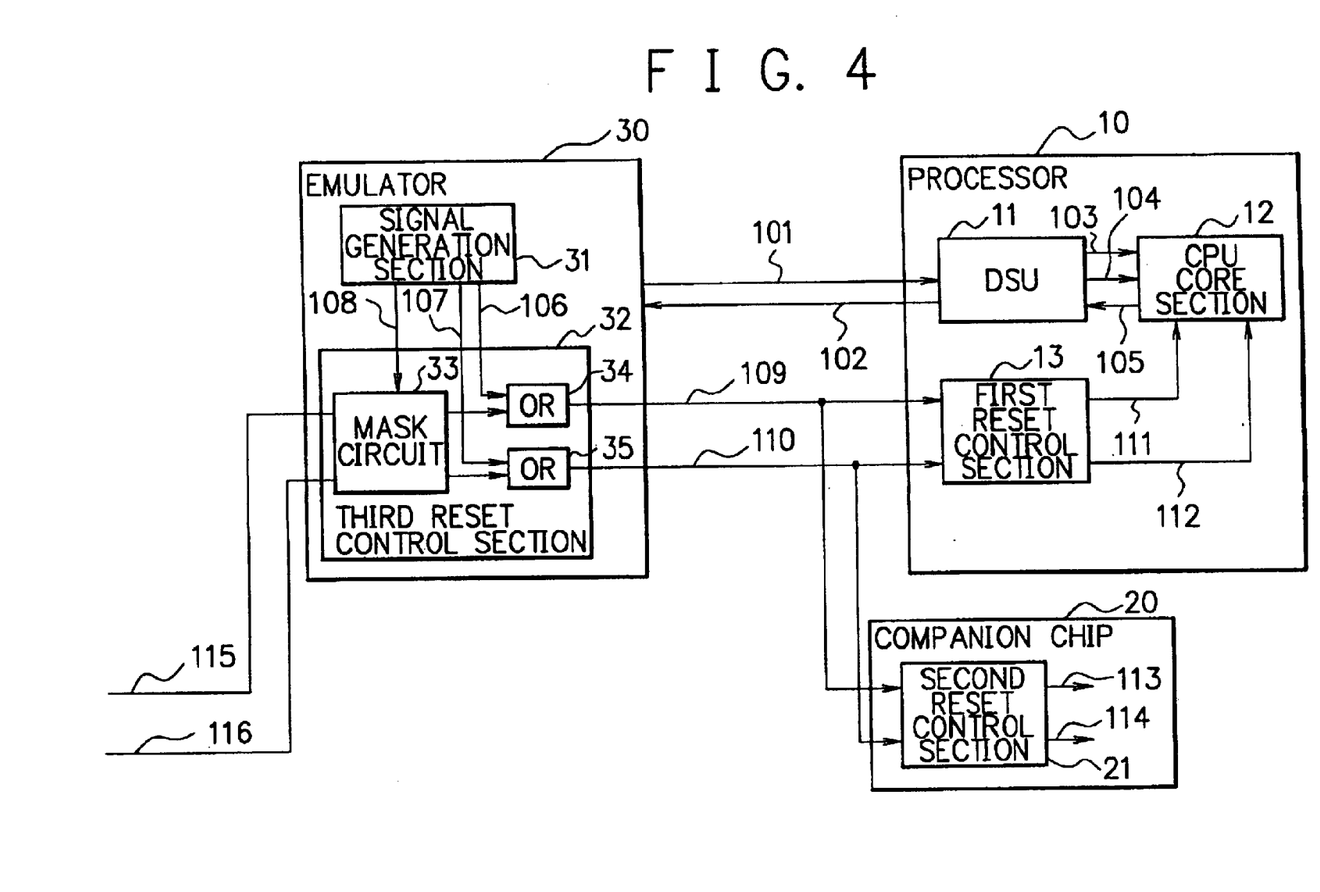
FIG. 4 is a block diagram showing the construction of a system using a reset control system according to the first embodiment of the present invention.

FIG. 4 is a block diagram showing the construction of a system using a reset control system according to the first embodiment of the present invention. This system includes a processor and a companion chip connected to the processor.

In this embodiment, as reset types, for example, power-on reset and hard reset will be described. Power-on reset is reset when powering on, which initializes the whole of the internal states of the processor and the companion chip. Contrastingly, hard reset partially initializes the internal states of the processor and the companion chip.

Referring to FIG. 4, reference numeral 10 denotes a processor; 20 denotes a companion chip; and 30 denotes an emulator. The processor 10 has a DSU 11, a CPU core section 12, and a first reset control section 13. The DSU 11 has an interface to the emulator 30 to receive a debug command 101 transmitted from the emulator 30 and transmit an execution result 102 to the emulator 30. When receiving the debug command 101 transmitted from the emulator 30, the DSU 11 outputs a debug mode signal 103 to make the processor 10 transit from the user mode to the debug mode.

The DSU 11 also decodes the received debug command 101 and supplies the decoding result to the CPU core section 12 as a debug instruction signal 104. The CPU core section 12 executes processing in accordance with the received debug instruction signal 104 and notifies the DSU 11 of an execution result 105. The DSU 11 transmits the execution result 105 received from the CPU core section 12 to the emulator 30 as the execution result 102 of the debug command 101 transmitted from the emulator 30.

The CPU core section 12 includes a CPU core and a processor bus control section and is connected to the companion chip 20 through a processor bus (not shown).

When receiving, from the emulator 30, a first system reset signal 109 corresponding to power-on reset, the first reset control section 13 generates a first processor internal reset signal 111 and outputs it to the CPU core section 12. When receiving a second system reset signal 110 corresponding to hard reset, the first reset control section 13 generates a second processor internal reset signal 112 and outputs it to the CPU core section 12.

The companion chip 20 comprises a second reset control section 21, and a not-shown bus conversion section and not-shown peripheral resources.

Like the first reset control section 13, when receiving the first system reset signal 109, a second reset control section 21 generates a first companion chip internal reset signal 113 and outputs it to the bus conversion section and peripheral resources in the companion chip 20. When receiving the second system reset signal 110, the second reset control section 21 generates a second companion chip internal reset signal 114 and outputs it to the bus conversion section and peripheral resources in the companion chip 20.

The emulator 30 includes a signal generation section 31 for generating emulator reset signals 106 and 107 and mask signal 108, and a third reset control section 32 for controlling a reset signal. The emulator 30 transmits the debug command 101 except a reset command to the DSU 11 and receives the execution result 102 from the DSU 11.

When the emulator 30 has transmitted the debug command 101 to the DSU 11, i.e., debug is being performed, the signal generation section 31 outputs the mask signal 108 to a third reset control section 32. When reset of the processor 10 and the companion chip 20 is requested, the signal generation section 31 generates the emulator reset signal 106 or 107 corresponding to the power-on reset request or hard reset request and outputs it to the third reset control section 32.

The third reset control section 32 includes a mask circuit 33 and OR circuits 34 and 35. In accordance with the mask signal 108 input from the signal generation section 31, the mask circuit 33 masks an external reset signal 115 or 116 corresponding to power-on reset or hard reset, which is input from an external reset generation circuit (not shown). This mask circuit 33 constitutes the mask processing section of the present invention.

The OR circuit 34 and 35 OR-operate the emulator reset signals 106 and 107 output from the signal generation section 31 and an external reset signal output from the mask circuit 33, and output the OR operation results as the system reset signals 109 and 110, respectively. The OR circuits 34 and 35 constitute the system reset output section of the present invention.

The operation of the reset control system shown in FIG. 4 will be described next.

Assume that the debug command 101 is not transmitted from the emulator 30, and no reset request is output from the emulator 30, i.e., the processor 10 is normally operating in the user mode. At this time, the signal generation section 31 in the emulator 30 outputs none of the first emulator reset signal 106, the second emulator reset signal 107, and the mask signal 108.

In this user mode, for example, when the first external reset signal 115 corresponding to power-on reset is generated by the external reset generation circuit (not shown), it is input to the mask circuit 33 in the emulator 30. Since the mask signal 108 is not output from the signal generation section 31, the mask circuit 33 outputs the received first external reset signal 115 to the OR circuit 34 without masking it.

The OR circuit 34 OR-operates the first emulator reset signal 106 output from the signal generation section 31 and the first external reset signal output from the mask circuit 33, and outputs the operation result as the first system reset signal 109. In this case, since the first emulator reset signal 106 is not output, the signal from the mask circuit 33 directly passes through the OR circuit 34. The first system reset signal 109 output from the OR circuit 34 is distributed and supplied to the first reset control section 13 in the processor 10 and the second reset control section 21 in the companion chip 20.

Even when the second external reset signal 116 corresponding to hard reset is generated in the user mode, it passes through the mask circuit 33 and OR circuit 35 and is supplied to the first reset control section 13 in the processor 10 and the second reset control section 21 in the companion chip 20, as in the case wherein the first external reset signal 115 is generated.

On the other hand, when the processor 10 is in the debug mode, the signal generation section 31 outputs the mask signal 108.

When the processor 10 is in the debug mode, and the emulator 30 is requested to reset the processor 10 and the companion chip 20, the signal generation section 31 in the emulator 30 outputs an emulator reset signal 106 or 107 corresponding to the reset request. When power-on reset is requested, the first emulator reset signal 106 is output. When hard reset is requested, the second emulator reset signal 107 is output.

A case wherein the reset request to the emulator 30 is, e.g., a power-on reset request will be described below.

When the emulator 30 receives a power-on reset request, the signal generation section 31 outputs the first emulator reset signal 106 to the OR circuit 34.

The OR circuit 34 OR-operates the first emulator reset signal 106 and the first external reset signal output from the mask circuit 33 and outputs the calculation result as the first system reset signal 109. In this case, even when the first external reset signal 115 is generated due to some reason, it is not output to the OR circuit 34 because the external reset signal is masked by the mask circuit 33 in accordance with the mask signal 108 output from the signal generation section 31.

Hence, the first emulator reset signal 106 output from the signal generation section 31 passes through the OR circuit 34 and is output as the first system reset signal 109. The first system reset signal 109 output from the OR circuit 34 is distributed and supplied to the first reset control section 13 in the processor 10 and the second reset control section 21 in the companion chip 20.

Even when the second external reset signal 116 is generated due to some reason, it is not output to the OR circuit 35 because it is masked by the mask circuit 33 in accordance with the mask signal 108 output from the signal generation section 31. Hence, only the first emulator reset signal 106 that has passed through the OR circuit 34 is supplied to the first reset control section 13 in the processor 10 and the second reset control section 21 in the companion chip 20 as the first system reset signal 109.

The first reset control section 13 in the processor 10 generates the first processor internal reset signal 111 in accordance with the received first system reset signal 109 to initialize the CPU core section 12. The second reset control section 21 in the companion chip 20 also generates the first companion chip internal reset signal 113 to initialize the bus conversion section and peripheral resources in the companion chip 20.

Assume that when the processor 10 is in the debug mode, the debug command 101 is transmitted from the emulator 30 to the DSU 11, and the CPU core section 12 is executing processing on the basis of the transmitted debug command 101. At this time, even when the external reset signal 115 or 116 is generated by the external reset generation circuit (not shown) due to some reason, the generated external reset signal 115 or 116 is masked by the mask circuit 33 in the emulator 30 in accordance with the mask signal 108 output from the signal generation section 31 and invalidated.

Hence, while the CPU core section 12 is executing processing on the basis of the debug command 101 from the emulator 30, the CPU core section 12 can continue processing without having its internal state initialized in accordance with the external reset signal 115 or 116 generated by the external reset generation circuit (not shown).

As described above, according to this embodiment, the emulator reset signal 106 or 107 input from the signal generation section 31 in the emulator 30 and the external reset signal 115 or 116 input from the external reset generation circuit are OR-operated by the OR circuit 34 or 35. The OR operation result is output as the system reset signal 109 or 110 and distributed and supplied to the processor 10 and companion chip 20. Thus, not only in the normal operative state but also during debugging of the system, both the processor 10 and the companion chip 20 can be initialized by the emulator reset signal 106 or 107 generated in accordance with a reset instruction from the emulator 30.

When the processor 10 is in the debug mode, the mask signal 108 for masking the external reset signal 115 or 116 is output from the signal generation section 31 to the mask circuit 33. Hence, when the system is being debugged, the external reset signal 115 or 116 undesirably input due to an error in external reset generation circuit can be masked by the mask circuit 33. For this reason, the processor 10 and the companion chip 20 can be prevented from being initialized by the external reset signal 115 or 116 during debug.

In this embodiment, the first reset control section 13 is provided in the processor 10, and the second reset control section 21 is provided in the companion chip 20. Instead of providing the reset control sections 13 and 20, the first and second system reset signals 109 and 110 may be directly input to the CPU core section 12 and the bus conversion section and peripheral resources in the companion chip 20.

The second embodiment of the present invention will be described next.

Figure 5:
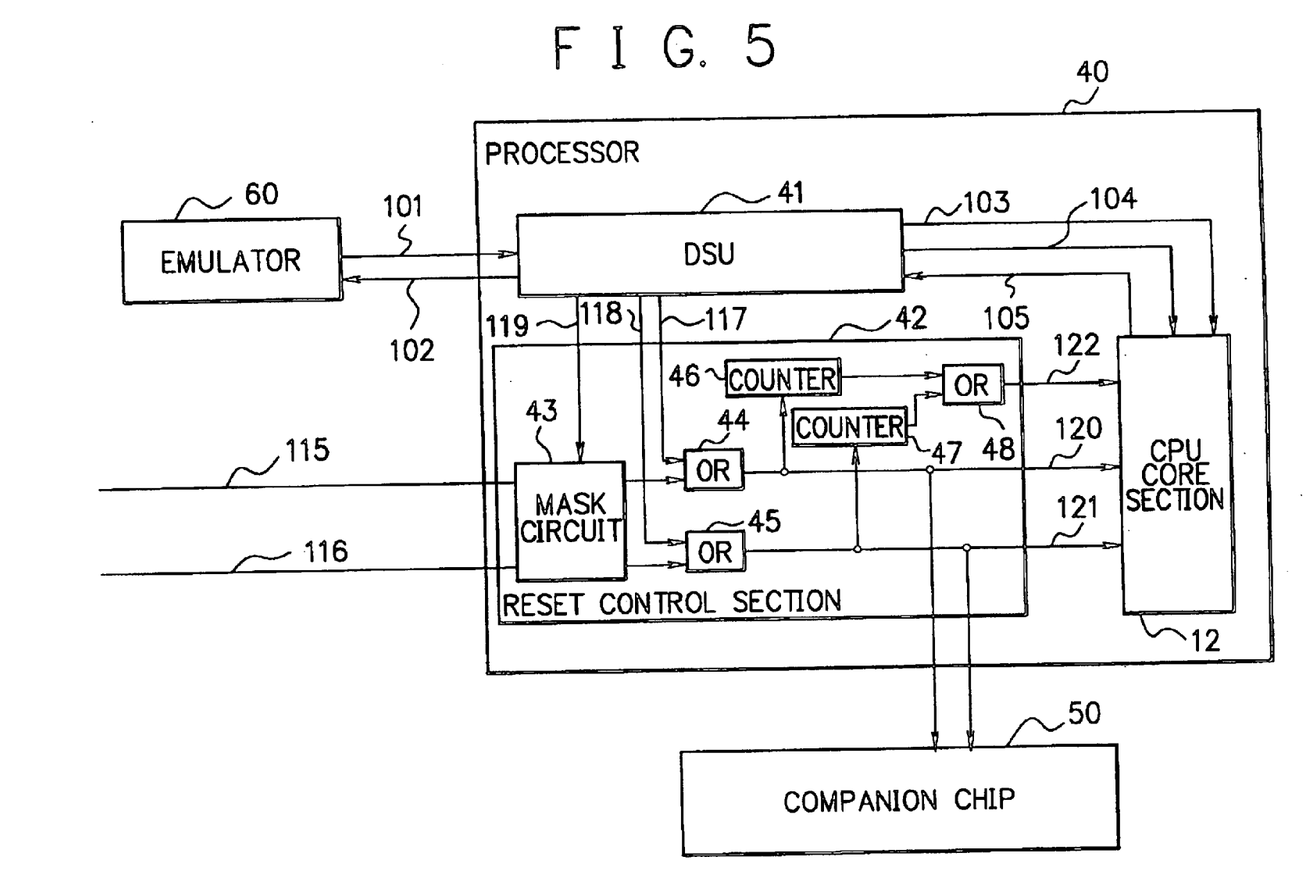
FIG. 5 is a block diagram showing the construction of a system using a reset control system according to the second embodiment of the present invention.

FIG. 5 is a block diagram showing the construction of a system using a reset control system according to the second embodiment. In FIG. 5, the same reference numerals as in FIG. 4 denote the same blocks as in FIG. 4, respectively, and a detailed description thereof will be omitted.

In the first embodiment shown in FIG. 4, the reset control section for generating a system reset signal is provided in the emulator 30. In the second embodiment, however, the corresponding reset control section for generating a system reset signal is provided in a processor 40.

Additionally, in the first embodiment shown in FIG. 4, the first reset control section 13 is provided in the processor 10, and the second reset control section 21 is provided in the companion chip 20. In the second embodiment, however, neither of the first and second reset control sections is provided.

Referring to FIG. 5, reference numeral 40 denotes a processor; 50 denotes a companion chip; and 60 denotes an emulator. The processor 40 has a DSU 41, a CPU core section 12, and a reset control section 42. The DSU 41 has an interface to the emulator 60 to receive a debug command 101 transmitted from the emulator 60 and transmit an execution result 102 to the emulator 60. When receiving the debug command 101 transmitted from the emulator 60, the DSU 41 outputs a mask signal 119 and debug mode signal 103 so the processor 40 transits from the user mode to the debug mode. The DSU 41 also decodes the received debug command 101.

If the decoding result reveals that the debug command 101 received from the emulator 60 is a power-on reset command, the DSU 41 generates a first emulator reset signal 117 corresponding to power-on reset and outputs it to an OR circuit 44. If the received debug command 101 is a hard reset command, the DSU 41 generates a second emulator reset signal 118 corresponding to hard reset and outputs it to another OR circuit 45.

If the decoding result shows that the debug command 101 received from the emulator 60 is a command other than a reset command, the DSU 41 supplies the decoding result to the CPU core section 12 as a debug instruction signal 104. The CPU core section 12 executes processing in accordance with the received debug instruction signal 104 and notifies the DSU 41 of an execution result 105. The DSU 41 transmits the execution result 105 received from the CPU core section 12 to the emulator 60 as the execution result 102 of the debug command 101 transmitted from the emulator 60.

The reset control section 42 controls a first external reset signal 115 corresponding to power-on reset and a second external reset signal 116 corresponding to hard reset, both of which are input from an external reset generation circuit (not shown), and the first and second emulator reset signals 117 and 118 input from the DSU 41, and outputs first and second system reset signals 120 and 121.

The internal construction of the reset control section 42 will be described below.

A mask circuit 43 masks the first and second external reset signals 115 and 116 in accordance with the mask signal 119 input from the DSU 41. The mask circuit 43 constitutes the mask processing section of the present invention.

The OR circuits 44 and 45 OR-operate the first and second emulator reset signals 117 and 118 output from the DSU 41 and the first and second external reset signals output from the mask circuit 43 and output the OR operation results as the first and second system reset signals 120 and 121, respectively. The OR circuits 44 and 45 constitute the system reset output section of the present invention.

Either of counters 46 and 47 adjusts any difference in reset completion time due to a difference in internal circuit between the processor 40 and the companion chip 50. Either of the counters 46 and 47 measures the time from reset cancel of the processor 40 to reset cancel of the companion chip 50, by counting internal clock pulses. After the time from reset cancel of the processor 40 to reset cancel of the companion chip 50 is measured up, the counters 46 and 47 output activation signals to an OR circuit 48.

More specifically, after the elapse of a predetermined time from detection of negate of the system reset signals 120 and 121, the counters 46 and 47 output the activation signals to the OR circuit 48. The OR circuit 48 OR-operates the activation signals output from the counters 46 and 47 and outputs the OR operation result to the CPU core section 12 as an activation enable signal 122, thereby activating the core section 12. The counters 46 and 47 and the OR circuit 48 form a block for synthesizing the activation timing between the processor 40 and the companion chip 50 after reset negate and constitute the synchronization processing section of the present invention.

The companion chip 50 is constructed by a not-shown bus conversion section and not-shown peripheral resources and connected to the processor 40 through a processor bus.

In this embodiment, no reset control section is provided in the companion chip 50. However, a reset control section for generating an internal reset signal from the system reset signal 120 or 121 input from the processor 40 may be provided in the companion chip 50.

The operation of the reset control system shown in FIG. 5 will be described next.

Assume that the debug command 101 is not transmitted from the emulator 60, and the processor 40 is normally operating in the user mode. At this time, the DSU 41 outputs none of the first emulator reset signal 117, the second emulator reset signal 118, and the mask signal 119.

In this user mode, for example, when the first external reset signal 115 corresponding to power-on reset is generated by the external reset generation circuit (not shown), it is input to the mask circuit 43 in the processor 40. Since the mask signal 119 is not output from the DSU 41, the mask circuit 43 outputs the received first external reset signal 115 to the OR circuit 44 without masking it.

The OR circuit 44 OR-operates the first emulator reset signal 117 output from the DSU 41 and the first external reset signal output from the mask circuit 43 and outputs the OR operation result as the first system reset signal 120. In this case, since the first emulator reset signal 117 is not output, the signal from the mask circuit 43 directly passes through the OR circuit 44. The first system reset signal 120 output from the OR circuit 44 is distributed and supplied to the CPU core section 12, the CPU core section 12, and the counter 46.

The CPU core section 12 and the companion chip 50 are initialized in accordance with the first system reset signal 120 supplied to the CPU core section 12 and companion chip 50. The counter 46 detects the negate of the received first system reset signal 120, counts a predetermined time from reset negate detection, and then outputs an activation signal to the OR circuit 48.

The OR circuit 48 OR-operates the activation signals output from the counters 46 and 47 and supplies the OR operation result to the CPU core section 12 as the activation enable signal 122. In this case, since no activation signal is output from the counter 47, the output from the counter 46 directly passes through the OR circuit 48. After reset processing, the CPU core section 12 receives the activation enable signal 122 to start operation, and executes processing from a reset vector.

When the second external reset signal 116 corresponding to hard reset is input, the same operation as in the case of input of the first external reset signal 115 is performed except the reset range.

On the other hand, when the debug command 101 is transmitted from the emulator 60 to the DSU 41, and the processor 40 is in the debug mode, the DSU 41 outputs the mask signal 119.

When the debug command 101 transmitted from the emulator 60 is a power-on reset command or a hard reset command, the DSU 41 outputs the first emulator reset signal 117 or the second emulator reset signal 118 corresponding to the received reset command.

A case wherein the received debug command 101 is a power-on reset command, and the first emulator reset signal 117 corresponding to the reset command is output will be described below.

When receiving a power-on reset command from the emulator 60, the DSU 41 outputs the first emulator reset signal 117 to the OR circuit 44. The OR circuit 44 OR-operates the first emulator reset signal 117 output from the DSU 41 and the first external reset signal output from the mask circuit 43 and outputs the OR operation result as the first system reset signal 120. In this case, the first external reset signal 115 is not output to the OR circuit 44 because the signal is masked by the mask circuit 43 in accordance with the mask signal 119 output from the DSU 41.

Hence, the first emulator reset signal 117 output from the DSU 41 passes through the OR circuit 44 and is output as the first system reset signal 120. The first system reset signal 120 output from the OR circuit 44 is distributed and supplied to the CPU core section 12, the companion chip 50, and the counter 46.

The CPU core section 12 and the companion chip 50 are initialized in accordance with the first system reset signal 120 supplied to the CPU core section 12 and companion chip 50. The counter 46 detects the negate of the received first system reset signal 120 and outputs an activation signal to the OR circuit 48 after the elapse of a predetermined time from reset negate detection.

The OR circuit 48 OR-operates the activation signals output from the counters 46 and 47 and supplies the OR operation result to the CPU core section 12 as the activation enable signal 122. In this case, since no activation signal is output from the counter 47, the output from the counter 46 directly passes through the OR circuit 48. After reset processing, the CPU core section 12 receives the activation enable signal 122 to start operation, and executes processing from a reset vector which is a start address of a program to be loaded immediately after reset.

Even when the second external reset signal 116 is generated due to some reason, it is not output to the OR circuit 45 because the external reset signal is masked by the mask circuit 43 in accordance with the mask signal 119 output from the DSU 41. Hence, only the first emulator reset signal 117 that has passed through the OR circuit 44 is supplied to the CPU core section 12, the companion chip 50, and the counter 46 as the first system reset signal 120.

Assume that when the processor 40 is in the debug mode, the debug command 101 other than a reset command is transmitted from the emulator 60 to the DSU 41, and the CPU core section 12 is executing processing on the basis of the transmitted debug command 101. At this time, even when the external reset signal 115 or 116 is generated by the external reset generation circuit (not shown) due to some reason, it is masked by the mask circuit 43 in the DSU 41 in accordance with the mask signal 119 output from the DSU 41 and invalidated.

Hence, while the CPU core section 12 is executing processing on the basis of the debug command 101 other than a reset command from the emulator 60, the CPU core section 12 can continue processing without having its internal state initialized in accordance with the external reset signal 115 to 116 generated by the external reset generation circuit (not shown).

As described above, according to the second embodiment, the external reset signal 115 or 116 input from the external reset generation circuit and the emulator reset signal 117 or 118 input from the DSU 41 are OR-operated by the OR circuit 44 or 45. The OR operation result is output as the system reset signal 120 or 121 and distributed and supplied to the CPU core section 12 and the companion chip 50. Thus, not only in the normal operative state but also during debugging of the system, both the processor 40 and the companion chip 50 can be initialized by the emulator reset signal 117 or 118 generated in accordance with a reset instruction from the emulator 60.

When the processor 40 is in the debug mode, the mask signal 119 for masking the external reset signal 115 or 116 is output from the DSU 41 to the mask circuit 43. Hence, when the system is being debugged, the external reset signal 115 or 116 undesirably input due to an error in external reset generation circuit can be masked by the mask circuit 43. For this reason, the processor 40 and the companion chip 50 can be prevented from being initialized by the external reset signal 115 or 116 during debug.

According to this embodiment, the reset control section 42 having the OR circuits 44 and 45 is provided in the processor 40 to generate the system reset signals 120 and 121 in the processor 40, unlike the first embodiment in which the system reset signal is generated by the OR circuit in the emulator. For this reason, a reset request from the emulator 60 to the processor 40 can be transmitted as a command, and the types of external reset signals increase. Even when the types of reset instructions from the emulator 60 must be increased, it can be easily done by expanding the command by, e.g., changing the bit sequence of the debug command 101 to be transmitted from the emulator 60 without changing the interface between the emulator 60 and the processor 40.

In this embodiment, the reset control section 42 for generating the first system reset signal 120 or 121 from the external reset signal 115 or 116 and emulator reset signal 117 or 118 is provided in the processor 40, thereby directly inputting the external reset signal 115 or 116 to the processor 40. According to this construction, the input path of the external reset signals 115 and 116 need not be changed independently of whether the emulator 60 is connected, so debug can be performed in the same state as normal operation. In addition, even when the need for debug arises due to software update in normal operation, debug can be easily performed.

In this embodiment, the counters 46 and 47 are used to output the activation enable signal 122 for enabling activation of the CPU core section 12 to the CPU core section 12 after the elapse of a predetermined time from detection of the negate of the system reset signals 120 and 121. Thus, any time lag in reset cancel due to a difference in internal circuit between the processor 40 and the companion chip 50 can be adjusted, and the processor 40 and the companion chip 50 can be synchronously activated. That is, any time lag until activation after reset of the processor 40 and companion chip 50 can be adjusted, and the operation after reset cancel can be guaranteed. For example, when the processor 40 whose reset is canceled first accesses the companion chip 50 during the reset operation of the companion chip 50, the peripheral resources connected to the companion chip 50 through a PCI bus or the like can be prevented from becoming in accessible.

In this embodiment, when the DSU 41 receives the debug command 101 from the emulator 60, the DSU 41 generates the mask signal 119 to mask the external reset signal 115 or 116. However, the debug mode signal 103 used by the DSU 41 to make the processor 40 transit to the debug mode may be used as a mask signal instead of the mask signal 119.

The third embodiment of the present invention will be described next.

Figure 6:
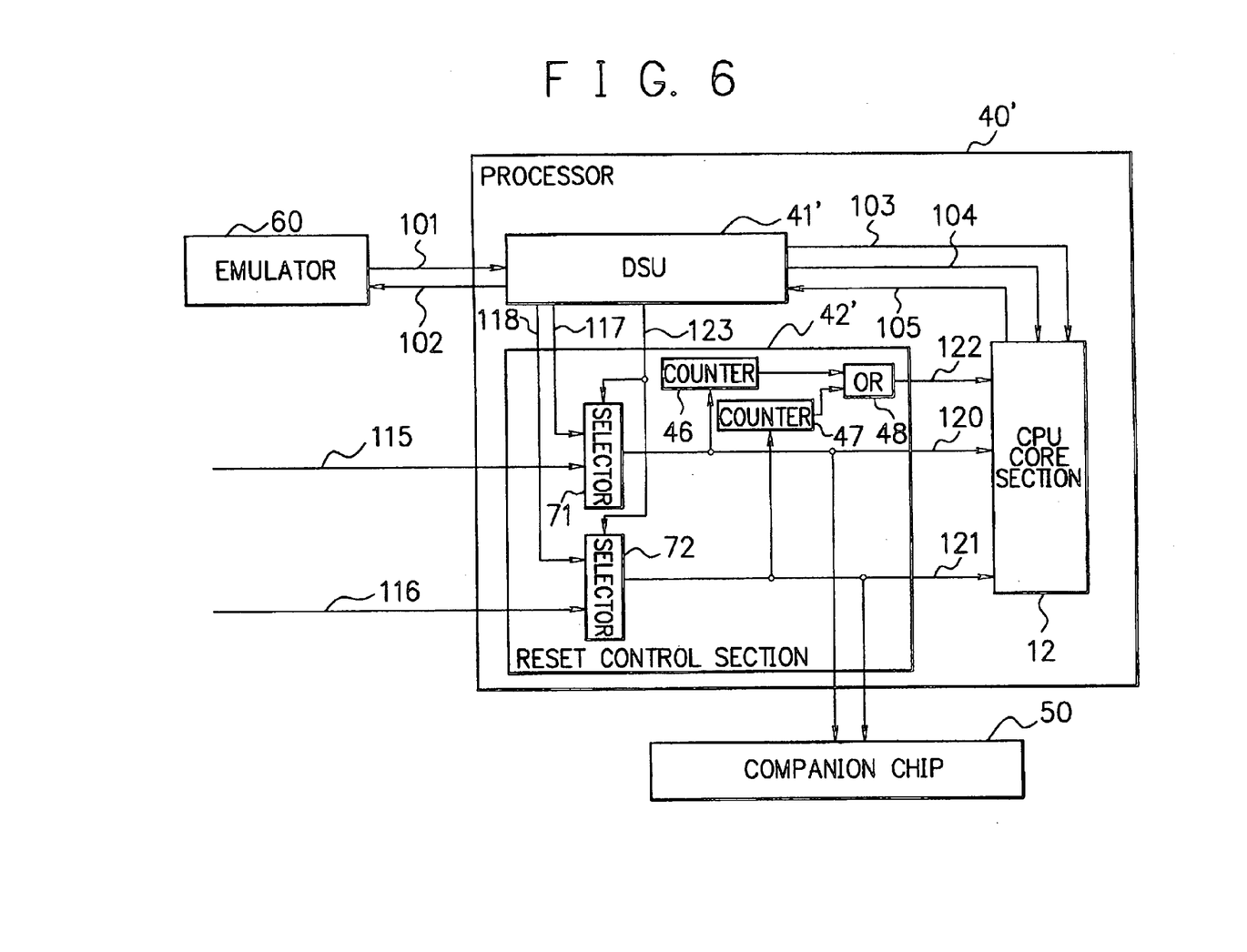
FIG. 6 is a block diagram showing the construction of a system using a reset control system according to the third embodiment of the present invention.

FIG. 6 is a block diagram showing the construction of a system using a reset control system according to the third embodiment. In FIG. 6, the same reference numerals as in FIGS. 4 and 5 denote the same blocks as in FIGS. 4 and 5, respectively, and a detailed description thereof will be omitted.

Referring to FIG. 6, reference numeral 40' denotes a processor which includes a DSU 41', a CPU core section 12, and a reset control section 42'. The DSU 41' has an interface to an emulator 60 to receive a debug command 101 transmitted from the emulator 60 and transmit an execution result 102 to the emulator 60. When receiving the debug command 101 transmitted from the emulator 60, the DSU 41' outputs a reset selection signal 123 and a debug mode signal 103 to make the processor 40' transit from the user mode to the debug mode. The DSU 41' also decodes the received debug command 101.

If the decoding result reveals that the debug command 101 received from the emulator 60 is a power-on reset command, the DSU 41' generates a first emulator reset signal 117 corresponding to power-on reset and outputs it to a selector circuit 71. If the received debug command 101 is a hard reset command, the DSU 41' generates a second emulator reset signal 118 corresponding to hard reset and outputs it to a selector circuit 72.

If the decoding result indicates that the debug command 101 received from the emulator 60 is a command other than a reset command, the DSU 41' supplies the decoding result to the CPU core section 12 as a debug instruction signal 104. The CPU core section 12 executes processing in accordance with the received debug instruction signal 104 and notifies the DSU 41' of an execution result 105. The DSU 41' transmits the execution result 105 received from the CPU core section 12 to the emulator 60 as the execution result 102 of the debug command 101 transmitted from the emulator 60.

On the basis of the reset selection signal 123 output from the DSU 41', the selector circuits 71 and 72 selectively supply one of a first external reset signal 115 corresponding to power-on reset and input from an external reset generation circuit and the emulator reset signal 117 input from the DSU 41' and one of a second external reset signal 116 corresponding to hard reset and the emulator reset signal 118 input from the DSU 41' as system reset signals 120 and 121, respectively. The selector circuits 71 and 72 constitute the reset selection of the present invention.

The operation of the reset control system shown in FIG. 6 will be described next.

Assume that the debug command 101 is not transmitted from the emulator 60, and the processor 40' is normally operating in the user mode. At this time, neither of the first emulator reset signal 117 and the second emulator reset signal 118 is output from the DSU 41'. The reset selection signal 123 is output to select the external reset signal 115 or 116.

In this user mode, for example, when the first external reset signal 115 corresponding to power-on reset is generated by the external reset generation circuit (not shown), it is input to the selector circuit 71 in the processor 40'. The selector circuit 71 selects the first external reset signal 115 in accordance with the reset selection signal 123 output from the DSU 41' and outputs the external reset signal 115 as the first system reset signal 120.

When the second external reset signal 116 corresponding to hard reset is input, the same operation as in the case of input of the first external reset signal 115 is performed except the reset range.

On the other hand, when the debug command 101 is transmitted from the emulator 60, and the processor 40' is in the debug mode, the reset selection signal 123 output from the DSU 41' is output to select the emulator reset signal 117 or 118 output from the DSU 41'.

When the debug command 101 transmitted from the emulator 60 is a power-on reset command or hard reset command, the DSU 41' outputs the first emulator reset signal 117 or second emulator reset signal 118 corresponding to the received reset command.

For example, when receiving a power-on reset command from the emulator 60, the DSU 41' outputs the first emulator reset signal 117 to the selector circuit 71. In accordance with the reset selection signal 123 output from the DSU 41', the selector circuit 71 selects the first emulator reset signal 117 and outputs it as the first system reset signal 120.

The external reset signal 115 selected by the selector circuit 71 in the user mode as the first system reset signal 120 or the emulator reset signal 117 selected as the first system reset signal 120 in the debug mode is distributed and supplied to the CPU core section 12, the companion chip 50, and the counter 46.

The CPU core section 12 and the companion chip 50 are initialized in accordance with the first system reset signal 120 supplied to the CPU core section 12 and the companion chip 50. The counter 46 detects the negate of the received first system reset signal 120 and outputs an activation signal to an OR circuit 48 after the elapse of a predetermined time from reset negate detection.

The OR circuit 48 OR-operates the activation signals output from the counters 46 and 47 and supplies the OR operation result to the CPU core section 12 as an activation enable signal 122. In this case, since no activation signal is output from the counter 47, the output from the counter 46 directly passes through the OR circuit 48. After reset processing, the CPU core section 12 receives the activation enable signal 122 to start operation, and executes processing from a reset vector.

Even when the first external reset signal 115 is generated due to some reason during supply of the first emulator reset signal 117, the first emulator reset signal 117 is selected by the selector 71 on the basis of the reset selection signal 123. Even when the second external reset signal 116 is generated due to some reason during supply of the first emulator reset signal 117, the second emulator reset signal 118 is selected by the selector 72 on the basis of the reset selection signal 123. However, since the second emulator reset signal 118 is not output at this time, reset is not performed on the basis of this signal.

In addition, even when the emulator reset signal 117 or 118 is output from the DSU 41' due to some reason when the processor 40' is normally operating in the user mode, the emulator reset signal 117 or 118 is not selected by the selector 71 or 72 in the processor 40' on the basis of the reset selection signal 123, so the output emulator reset signal 117 or 118 is invalidated.

Hence, when the processor 40' is normally operating, the CPU core section 12 can continue the normal operation without initializing its internal state in accordance with the emulator reset signal 117 or 118 output from the DSU 41'.

Assume that when the processor 40' is in the debug mode, the debug command 101 other than a reset command is transmitted from the emulator 60 to the DSU 41', and the CPU core section 12 is executing processing on the basis of the transmitted debug command 101. At this time, even when the external reset signal 115 or 116 is generated by the external reset generation circuit (not shown) due to some reason, the external reset signal 115 or 116 is not selected by the selector 71 or 72 in the processor 40' on the basis of the reset selection signal 123, and the output external reset signal 115 or 116 is invalid. At this time, the emulator reset signal 117 or 118 is not output from the DSU 41'.

Hence, when the CPU core section 12 is executing processing on the basis of the debug command 101 other than a reset command from the emulator 60, the CPU core section 12 can continue processing without having its internal state initialized in accordance with the external reset signal 115 or 116 generated by the external reset generation circuit (not shown).

As described above, according to the third embodiment, the selector circuits 71 and 72 select one of the emulator reset signal 117 output from the DSU 41' in accordance with the reset command 101 from the emulator 60 and the external reset signal 115 input from the external reset generation circuit and one of the emulator reset signal 118 and the external reset signal 116 and output them as the system reset signals 120 and 121, respectively.

More specifically, when the processor 40' is normally operating in the user mode, the external reset signal 115 or 116 is valid. On the other hand, when the processor 40' is in the debug mode, the emulator reset signal 117 or 118 is valid.

According to this construction, in addition to the effect obtained by the second embodiment, the state during debug can be prevented from being initialized by the external reset signal 115 or 116 undesirably input when debug is being executed. In addition, the internal state can be prevented from being initialized by the emulator reset signal 120 or 121 undesirably input even during normal operation.

In this embodiment, when receiving the debug command 101 from the emulator 60, the DSU 41' generates the reset selection signal 123 which selects the emulator reset signal 117 or 118 in the debug mode, or the external reset signal 115 or 116 in normal operation. However, the debug mode signal 103 for causing the processor 40' to transit to the debug mode may be used as the reset selection signal.

In this embodiment, the selector circuits 71 and 72 for selecting the external reset signals 115 and 116 or the emulator reset signals 117 and 118 are used. When the mask circuit for masking the emulator reset signals 117 and 118 on the basis of a signal obtained by inverting the mask signal 119 is further prepared in the second embodiment shown in FIG. 5, the same effect as that of the third embodiment shown in FIG. 6 can be obtained.

In the second and third embodiments, the two counters 46 and 47 for generating the activation enable signal 122 are provided in accordance with the system reset signals 120 and 121, respectively. However, such counters may not always be prepared to correspond to the respective system reset signals 120 and 121. Only one counter may be prepared for such system reset signals. In this case, the system reset signals are OR-operated on the input side of the counter and the OR operation result is input to the counter.

In the second and third embodiments, to delay activation of the processor 40 or 40' after reset operation only by a predetermined time, the counters 46 and 47 are provided in the processor 40 or 40'. However, if reset of the companion chip 50 is canceled earlier than the processor 40 or 40' due to the internal circuit construction, a counter for delaying activation of the companion chip 50 is prepared in the companion chip 50. If the time lag between the processor 40 or 40' and the companion chip 50 until reset cancel need not be adjusted, no counter is necessary.

The time constant of the counter may be fixed in each counter or made externally settable. To set a time constant, it may be supplied from the emulator as a command or set by providing, in the processor, a register that is not initialized.

In the second and third embodiments, the reset control section 42 or 42' is provided in the processor 40 or 40'. A reset control section having the same function as that of the reset control section 42 or 42' may be provided in the companion chip 50.

In the first to third embodiments shown in FIGS. 4 to 6, the DSU 11, 41, or 41' is provided in the processor 10, 40, or 40', and the emulator 30 or 60 is connected to the processor 10, 40, or 40'. However, the DSU 11, 41, or 41' may be provided in the companion chip 20 or 50, and the emulator 30 or 60 may be connected to the companion chip 20 or 50.

In the first to third embodiments shown in FIGS. 4 to 6, two types of reset signals, i.e., two types of external reset signals and two types of emulator reset signals are used. However, the present invention is not limited to a reset control system for a system using two types of reset signals.

What is claimed is:

1. A reset control system of a system having a central processing section, which is formed on a chip, and a peripheral control section which is formed on another chip, said reset control system comprising:

an emulator; and a system reset output section generating and outputting a system reset signal on the basis of an external reset signal and an emulator reset signal based on a reset instruction from the emulator to independently implement a function of said central processing section;

wherein said system reset output section supplies said system reset signal to both chips of said central processing section and said peripheral control section.

2. The reset control system according to claim 1, wherein said system reset signal is generated by OR-operating said emulator reset signal and said external reset signal.

3. The reset control system according to claim 1, wherein said system reset output section is provided in the chip of said peripheral control section.

4. The reset control system according to claim 1, wherein said system reset output section is provided in the chip of said central processing section.

5. The reset control system according to claim 1, further comprising:

a mask processing section masking said external reset signal when said emulator is in operation.

6. The reset control system according to claim 1, further comprising:

a synchronization processing section synchronizing activation timings after reset between said central processing section and said peripheral control section, said synchronization processing section being formed on at least one of the chips of said central processing section and said peripheral control section.

7. The reset control system according to claim 6, wherein said synchronization processing section comprises an activation enable signal output section for outputting an activation enable signal for instructing to enable activation after elapse of a predetermined time after reset of said central processing section or said peripheral control section.

8. The reset control system according to claim 5, further comprising:

a synchronization processing section synchronizing activation timings after reset between said central processing section and said peripheral control section, said synchronization processing section being formed on at least one of the chips of said central processing section and said peripheral control section.

9. The reset control system according to claim 8, wherein said synchronization processing section comprises an activation enable signal output section for outputting an activation enable signal for instructing to enable activation after elapse of a predetermined time after reset of said central processing section or said peripheral control section.

10. A reset control system of a system having a central processing section and a peripheral control section which are formed on separate chips, said reset control system comprising:

an emulator;

a reset selection section selectively outputting, as a system reset signal, one of an external reset signal and an emulator reset signal based on a reset instruction from the emulator to independently implement a function of said central processing section;

wherein said system reset signal output from said reset selection section is supplied to both chips of said central processing section and said peripheral control section.

11. The reset control system according to claim 10, further comprising:

a synchronization processing section synchronizing activation timings after reset between said central processing section and said peripheral control section, wherein said synchronization processing section is formed on at least one of the chips of said central processing section and said peripheral control section.

12. The reset control system according to claim 11, wherein said synchronization processing section comprises an activation enable signal output section for outputting an activation enable signal for instructing to enable activation after elapse of a predetermined time after reset of said central processing section or said peripheral control section.

13. A reset control method of a system having a central processing section and a peripheral control section which are formed on separate chips, said method comprising:

masking an external reset signal when an emulator that independently implements a function of said central processing section is in operation;

generating a system reset signal on the basis of the masked external reset signal and an emulator reset signal based on a reset instruction from said emulator; and supplying said system reset signal to both chips of said central processing section and said peripheral control section.

14. The method according to claim 13, wherein said system reset signal is generated by OR-operating said emulator reset signal and said masked external reset signal.

15. A reset control method of a system having a central processing section and a peripheral control section which are formed on separate chips, said method comprising:

selectively outputting, as a system reset signal, one of an external reset signal and an emulator reset signal based on a reset instruction from an emulator to independently implement a function of said central processing section; and supplying said system reset signal to both chips of said central processing section and said peripheral control section.

* * * * *

UNITED STATES PATENT AND TRADEMARK OFFICE
CERTIFICATE OF CORRECTION

PATENT NO. : 6,877,112 B1
DATED : April 5, 2005
INVENTOR(S) : Hideyuki Iino et al.

It is certified that error appears in the above-identified patent and that said Letters Patent is hereby corrected as shown below:

Title page,
Item [57], ABSTRACT,
Line 8, after "reset" insert -- instruction from --.

Signed and Sealed this

Twentieth Day of December, 2005

JON W. DUDAS
*Director of the United States Patent and Trademark Office*